(12) United States Patent
Hahn et al.

(10) Patent No.: US 9,375,878 B2
(45) Date of Patent: Jun. 28, 2016

(54) METHOD AND APPARATUS FOR OPERATING A PLANT FOR THE TREATMENT OF CONTAINERS WITH SUPERORDINATED CHOICE OF PARAMETERS

(75) Inventors: Wolfgang Hahn, Neutraubling (DE); Markus Zoelfl, Metten (DE); Timo Pronold, Regensburg (DE)

(73) Assignee: KRONES AG, Neutraubling (DE)

( * ) Notice: Subject to any disclaimer, the term of this patent is extended or adjusted under 35 U.S.C. 154(b) by 675 days.

(21) Appl. No.: 13/813,580

(22) PCT Filed: Jul. 4, 2011

(86) PCT No.: PCT/EP2011/061177
§ 371 (c)(1),
(2), (4) Date: May 9, 2013

(87) PCT Pub. No.: WO2012/016771
PCT Pub. Date: Feb. 9, 2012

(65) Prior Publication Data
US 2013/0231772 A1    Sep. 5, 2013

(30) Foreign Application Priority Data

Aug. 3, 2010    (DE) .......................... 10 2010 033 171

(51) Int. Cl.
*G06F 19/00* (2011.01)
*B29C 45/76* (2006.01)
(Continued)

(52) U.S. Cl.
CPC ................. *B29C 67/00* (2013.01); *B29C 49/78* (2013.01); *B65C 9/40* (2013.01); *B67B 3/26* (2013.01);
(Continued)

(58) Field of Classification Search
CPC .................... B29C 45/76; B29C 2945/76531; B29C 45/78; B29C 67/00
USPC .......................................... 700/204
See application file for complete search history.

(56) References Cited

U.S. PATENT DOCUMENTS

| 6,205,743 B1 * | 3/2001 | Castellari ................ B29C 49/24 |
| | | 209/597 |
| 7,571,585 B2 * | 8/2009 | Till ........................ B29C 49/42 |
| | | 53/136.1 |

(Continued)

FOREIGN PATENT DOCUMENTS

| DE | 102004026640 | 12/2005 |
| DE | 102006051533 | 4/2008 |

(Continued)

*Primary Examiner* — Robert Fennema
*Assistant Examiner* — Jigneshkumar Patel
(74) *Attorney, Agent, or Firm* — Greer, Burns & Crain, Ltd.

(57) ABSTRACT

A method for operating an installation for handling containers, wherein the containers from a first handling unit of the installation are handled by predetermined first handling parameters and the containers from a second handling unit of the installation are handled by predetermined second handling parameters, and wherein the first handling parameters and the second handling parameters can be altered, at least in part, and depend, at least in part, on product parameters which are characteristic of the container. Product parameters of the container which are stored for controlling the first handling unit are also used for controlling the second handling unit, wherein alterations to the product parameters are taken into account in automated fashion both for controlling the first handling unit and for controlling the second handling unit.

9 Claims, 4 Drawing Sheets

(51) Int. Cl.
  *B67C 3/02* (2006.01)
  *B29C 67/00* (2006.01)
  *B29C 49/78* (2006.01)
  *B65C 9/40* (2006.01)
  *B67B 3/26* (2006.01)
  *B67C 3/00* (2006.01)
  *B29C 49/12* (2006.01)
  *B29C 49/42* (2006.01)
  *B29C 49/48* (2006.01)
  *B29C 49/58* (2006.01)

(52) U.S. Cl.
  CPC ............. *B67C 3/007* (2013.01); *B29C 49/12* (2013.01); *B29C 49/4252* (2013.01); *B29C 2049/1204* (2013.01); *B29C 2049/4856* (2013.01); *B29C 2049/5893* (2013.01)

(56) References Cited

U.S. PATENT DOCUMENTS

| 8,052,814 | B2 | 11/2011 | Kellhammer et al. |
| 2005/0194705 | A1 | 9/2005 | Smith |
| 2007/0162287 | A1 | 7/2007 | Dietzsch et al. |
| 2008/0271809 | A1* | 11/2008 | Goldman ................ B67C 3/007 141/9 |
| 2010/0071830 | A1* | 3/2010 | Putzer ...................... B65C 9/40 156/64 |
| 2010/0324723 | A1 | 12/2010 | Zech |
| 2011/0061347 | A1 | 3/2011 | Stoiber |

FOREIGN PATENT DOCUMENTS

| DE | 102009015522 | 10/2010 |
| EP | 1306195 | 5/2003 |
| EP | 2098355 | 9/2009 |
| WO | 2008145345 | 12/2008 |

\* cited by examiner

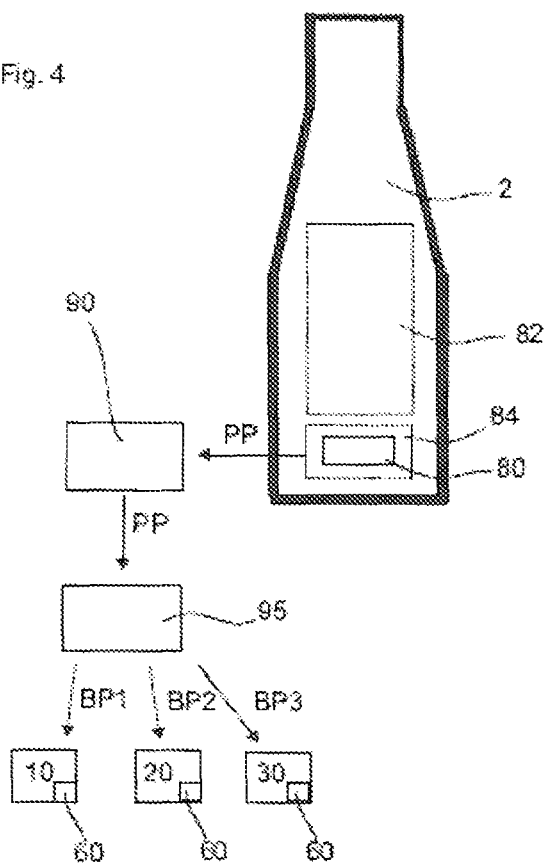
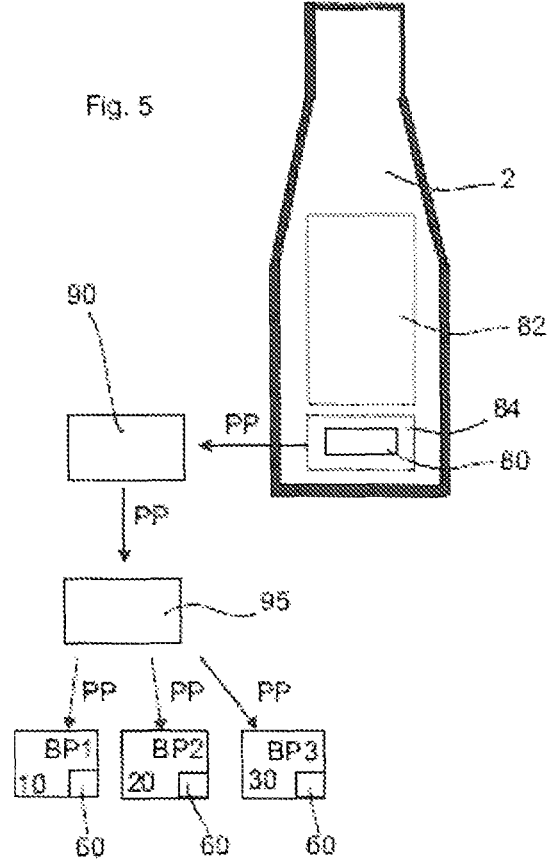

METHOD AND APPARATUS FOR OPERATING A PLANT FOR THE TREATMENT OF CONTAINERS WITH SUPERORDINATED CHOICE OF PARAMETERS

BACKGROUND

The present invention relates to a method of operating a plant for the treatment of containers as well as to a plant for the treatment of containers. Various plants for the treatment of containers are known from the prior art. In this way, fillers are known which fill containers, such as for example plastic or glass bottles, with liquids. In addition, so-called blow moulding machines or stretch blow moulding machines are also known which shape plastics material pre-forms into plastics material containers.

In this way, EP 1 471 008 A1 describes a method and a system for monitoring a packing or filling procedure. In this case first data information is detected which identify the packing or a packing material used for forming the packing as well as second data information which is used for describing the machine parts.

In addition, a container treatment plant, which has a detection device for detecting properties of a container to be treated, as well as a comparator device for comparing the detection results of the detection device with a nominal value of the container are known from the Patent Application No. 10 2009 040 977.7—not yet published—of the Applicants. The subject matter of this disclosure is hereby also made the subject matter of the following description by reference in its entirety.

In particular, when changing the programming of machines in the beverage industry over to a different type, for example to a new type of bottle, this is usually carried out on the machine by the user or fitter. In this case a previously applied type (which is available as a data set) is selected in the menu and charged. A data set of this type contains for example mechanical setting values on the machine which the user obtains in a manner indicated for the change-over.

It is also known to manage the types of individual machines centrally with a superordinated management of the types, for example in an LMS (line-management system), and to transfer them in a manner corresponding to a pending manufacturing order to the machines in question in each case.

In this case, however, the problem arises that the materials used also influence the parameter settings on the machine in situ. If for example a plastics material pre-form with different material properties, for example with additives for bonding oxygen in the beverage, is used, experience shows that this has an influence upon the setting of the heating and thus upon the heating parameters on the blow moulding machine. The nature of the surface of the bottle (roughness or coefficient of friction) can also be influenced and, as a result, the behaviour of the container can change during the treatment in a labelling machine or in a packer run-in. As shown by experience, the apparently similar materials of different manufacturers can also behave in a very different manner. The causes can be the manufacturing process used by the manufacturer for example for the plastics material pre-form, the process times set or other parameters.

This leads to a manual adaptation of the machine parameters used becoming necessary on the machines in a filling plant. This adaptation results in losses in the form of machine stoppages for the necessary new settings, losses in quality and thus a loss of product and packing material.

On the other hand, not only one type of product is produced in most filling plants. These plants are in fact designed in such a way that only one type is in production at one point in time, but it is possible to change over to a different type in a simple manner. The number of different production types and the time intervals between the refittings can vary very widely in this case.

The types of production themselves comprise several categories, such as for example the packaging shape, the packaging colour, the container shape, the container colour, the nature and the decoration of the closure or even the number, the shape and the decoration of the labels on the containers. In this case it is not necessary for all the machines of a plant or the parameters thereof to be dependent upon all the categories. In the case of labelling machines in particular, there are frequently a very large number of provision variants in practice. In this case in particular, the categories of the container shape, the closure shape and the provision of labels are relevant. The provision of labels can in turn be divided into sub-categories, such as for example the usable volume, the product and country-specific contents.

If therefore a refitting to a different type has to be carried out in the prior art, as well as mechanical refitting operations the production staff also have to set the previously set production type of the machine. This can be carried out for example by a superordinated co-ordinating control (Scada, MES) or directly on the machine operating means. The choice from a list on a touch-screen display has become established as customary for this input.

If, however, the number of production types is very large (for example the number of different provisions in a labelling machine is frequently several hundred) in practice, then from experience the type is also changed in relatively small portions of time. In this case the choice from a list is complex, time-consuming and prone to error for the operating staff. Since the types differ in part only in one criterion the texts of the type identifiers are frequently long and very similar. As a result of the limited area of the display only a small portion of the list is visible at any time, and the remaining parts have to be indicated in an awkward manner by scrolling through the list.

BRIEF DESCRIPTION OF THE DRAWINGS

In this way, erroneous settings frequently occur, as the user inadvertently selects a wrong product or another product is produced at least for a short time instead of the product actually intended. The object of the present invention is therefore to facilitate changes of type during the manufacture of containers and, in particular, beverage containers. This object is attained according to the invention by the subjects of the independent claims. Advantageous embodiments and further developments form the subject matter of the sub-claims.

In the case of a method according to the invention for the operation of a plant for the treatment of containers the containers are treated by a first treatment unit of the plant with pre-set first treatment parameters and the containers are treated by a second treatment unit of the plant with pre-set second treatment parameters. In this case the first treatment parameters and the second treatment parameters are variable at least in part and they depend at least in part upon product parameters characteristic of the container.

Figure 1:
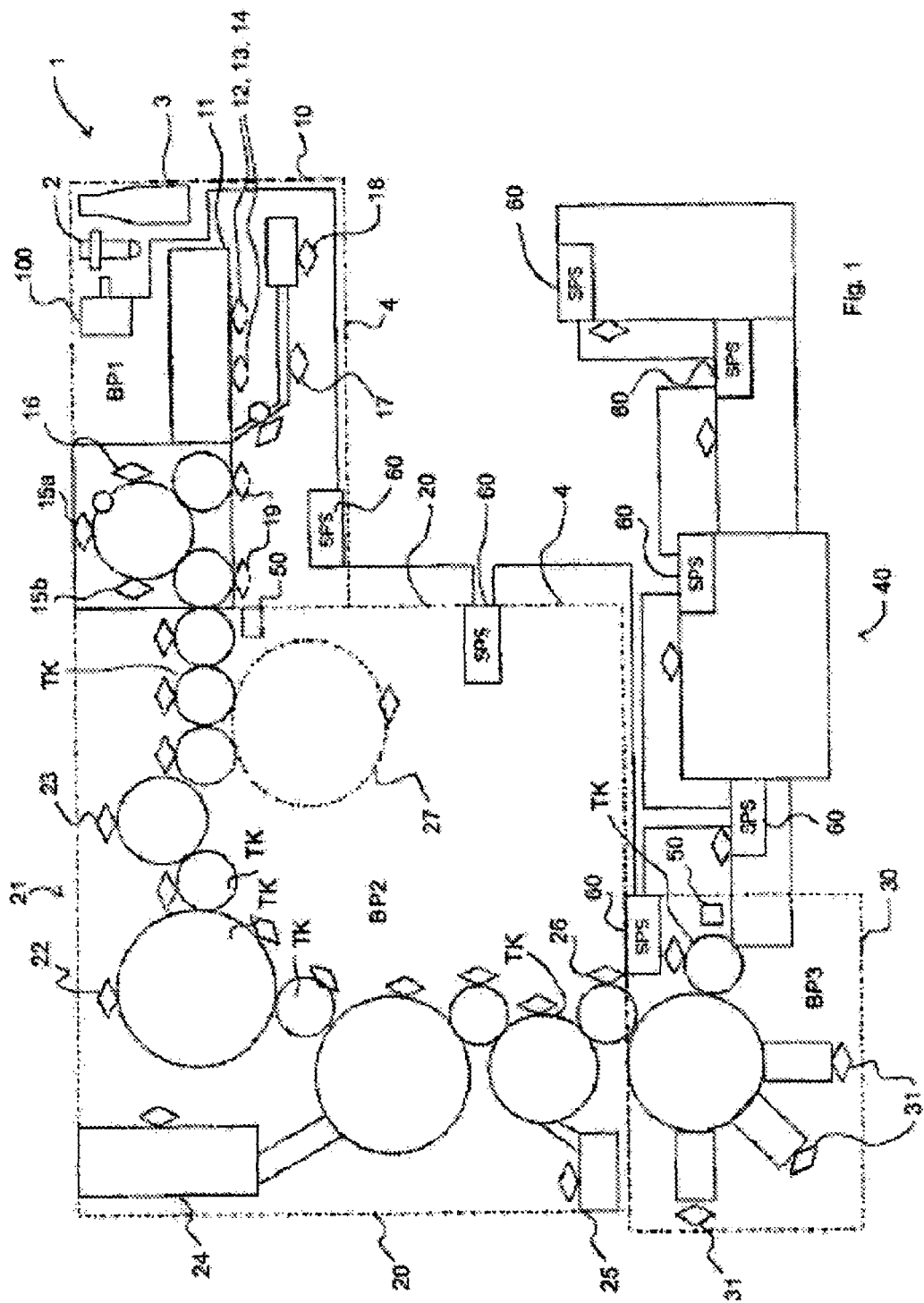

According to the invention, product parameters of the container deposited for the control of the first treatment unit are also used for the control of the second treatment unit, in which case changes in the product parameters are taken into consideration in an automated manner both for the control of the first treatment unit and for the control of the second treatment unit.

It is therefore proposed to transfer relevant data present on the machines of the plant, for example a filling plant, by way of the material actually used to the control means of the machine or to a central system and also to use them for example for the management of the types. If these data are also used for the management of the types, the sets of data which are correct in each case can be used directly on the machine or they can be directed from the central management of the types into the machine. A subsequent change of the parameters which is complicated and subject to considerable losses can be dispensed with in this case. An automated transfer or taking into consideration is understood in particular as being that the control of a treatment unit transfers the corresponding data or data or signals characteristic of these data to a further control device. If for example other materials are used during the production, for example if no further similar material is available, the necessary adaptation to the machine of parameters can be displayed. This is possible for example by a display on the screen of the machine.

Treatment parameters are understood to be all parameters which influence the treatment of the containers, such as for example blowing pressures in blow moulding machines, heating temperatures for pre-forms, conveying speeds and the like.

It would also be possible, however, for a direct setting or change to settings to be carried out at least in part on the machine.

In addition, it is also possible for the effects of different materials upon the operational behaviour of the machine or the plant respectively to be documented and evaluated by correlation of errors, operational times achieved, discards etc. This allows the user to judge and to select in an economical manner materials of different manufacturers and different quality.

It is therefore proposed that data which are available, in particular in a superordinated manner, should also be used for the control of further machines of the plant.

It is advantageous for production parameters relevant to the control of the first treatment unit to be transferred to a control means of the second treatment unit in such a way that they are also capable of being used for the control of the second treatment unit. In this case it would be possible in principle for a separate control device to be allocated to each treatment unit. It would also be possible, however, for a central control unit to actuate a plurality of treatment units. A transfer of the product parameters is possible both in a wireless manner and by way of connecting lines in this case.

It is advantageous for at least one product parameter characteristic of the container to be determined by the detection of an identification marking allocated to the container and for at least one treatment parameter to be changed on the basis of this characteristic product parameter.

It is therefore proposed that the choice of the type should be carried out not on the basis of a menu, for example on a display, but with specially encoded containers or sample bottles. In this way it is possible for a sample container, to which an identification marking is allocated, to be present for each type capable of being selected. In this case it is possible for this identification marking to be applied to the container itself, and for the container to be provided for example with a data matrix code with reference to which the types can be clearly differentiated. It would also be possible, however, for a plurality of sample containers to be arranged in the cabinet in the storage devices and for the identification devices to be allocated to the specified containers in another way, but in a clear manner, for example in the form of labels which are present on the corresponding storage means for the containers. The identification marking or the code respectively can also be applied in mass production by the label manufacturer, for example on the rear label or by way of an additional identification marking such as an additional sticker on the sample bottle. In addition, it would be possible for the identification markings to be applied directly on the container. In addition and/or as an alternative, however, a choice by way of a list on a display can also be made available.

Instead of the data matrix code mentioned above or possibly in addition to the latter, it would also be possible for an RFID transponder, which is arranged for example on the container, to be used. The characteristic parameters mentioned above could be read out or determined respectively by means of this transponder.

In order to carry out the change of the type, the machine operator has to select the encoded sample face, direct the hand-held reading device, such as for example a Cognex Data Man 750, onto the identification marking or code respectively thereof, and to enter the code by means of triggering the hand-held reader (for example by pressing a read-out button). The hand-held reading device is connected by way of a suitable interface to the machine or plant respectively (or the control means thereof respectively) and it transmits the detected code there. It is thus possible for a change of type to the appropriate type to be initiated directly by the detection of the new code.

In this way, the user can make the selection of the type by way of a face equipped in a finished manner. This is considerably simpler than the choice of a text from a very long list. It would also be possible, however, for the data to be taken from other sources, such as for example from delivery slips of the material. An identification marking, such as a bar code which can be read out by a detection appliance, is usually present on these delivery slips. In this way, it is possible for these data to be read in for example for a storage management system and to be used for the storage management.

In addition, it would be possible for the identification marking to be arranged on an outer packaging of the containers, for example on a cardboard box or a cage pallet, in which the plastics material pre-forms are arranged.

In this way, a saving in time can be achieved in the choice of the new type of product. In addition, the operation has the advantage that during a choice the choice is made visually or even haptically by way of the container and, in this way, a substantially simpler and more reliable monitoring is possible for the operating staff and only minor demands are also made upon the abstract thinking of the staff.

It is advantageous for the treatment unit of the plant to have a plurality of treatment elements and for the treatment parameters of a plurality of treatment elements to be changed. In this way, a plant of this type can have for example a filling device for filling the containers, labelling devices for labelling the containers, blow moulding stations for shaping plastics material pre-forms into plastics material containers, such as in particular stretch blow moulding machines, packing means, palletizing means and the like.

It is advantageous for the first treatment unit to be a shaping device for shaping plastics material into containers. In addition, however, the first treatment unit can also be a labelling machine for labelling the containers or a filling device for filling the containers.

In the case of a further advantageous method, information on the container to be produced is displayed to an operator by way of a display device in a manner dependent upon the parameters detected. To this end, a choice of possible containers can be displayed for example to a user, in which case he or she can choose the correct container with reference to this (reduced) choice. In addition, the user or operator can be prompted by way of the display device to confirm a selection made by the machine. To this end, a list of possible containers can be presented to the user.

The present invention further relates to a plant for the treatment of containers. This plant has a first treatment unit which treats the containers in a first pre-set manner, as well as a control device which controls the treatment of the containers by the first treatment unit on the basis of pre-set first treatment parameters, the first treatment parameters being capable of being changed at least in part and depending at least in part upon product parameters characteristic of the containers to be treated. In addition, the plant has a second treatment unit which treats the containers in a second pre-set manner, and a control device which controls the treatment of the containers by the second treatment unit on the basis of pre-set second treatment parameters, these second treatment parameters being capable of being changed at least in part and depending at least in part upon product parameters (of the containers to be treated) characteristic of the containers to be treated.

According to the invention product parameters of the container deposited for the control of the first treatment unit are also capable of being used for the control of the second treatment unit, in which case changes in the product parameters are taken into consideration in an automated manner both for the control of the first treatment unit and for the control of the second treatment unit.

In this way, it is also proposed with respect to the apparatus that product parameters which are deposited for a treatment unit or which, in particular, are previously known, should also be used for the control of a further treatment unit.

It is advantageous for the plant to have a data transfer device which transfers product parameters relevant to the control of the first treatment unit to a control device of the second treatment unit in such a way that they are capable of being used for the control of the second treatment unit.

It is advantageous for the plant to have a central control unit which communicates in terms of data with the control means of the individual treatment units at least for a time.

It is advantageous for the plant to have a detection device for detecting an identification marking which is allocated to the container, the detection device communicating in terms of data with the control device at least for a time in order to transmit product parameters of the container determined by detection of the identification marking to the control device. In reaction to the corresponding product parameters the control device can change the treatment parameters automatically for example or can display information on the steps of the change to be carried out to the user.

In the case of a preferred embodiment the detection device has an optical reader device which detects the identification marking. This can be for example a bar code scanner.

It is advantageous for at least one treatment unit to be selected from a group of treatment units which contains blow moulding machines, in particular stretch blow moulding machines, labelling machines, fillers, sterilization devices, closure devices and the like.

BRIEF DESCRIPTION OF THE DRAWINGS

Figure 2:
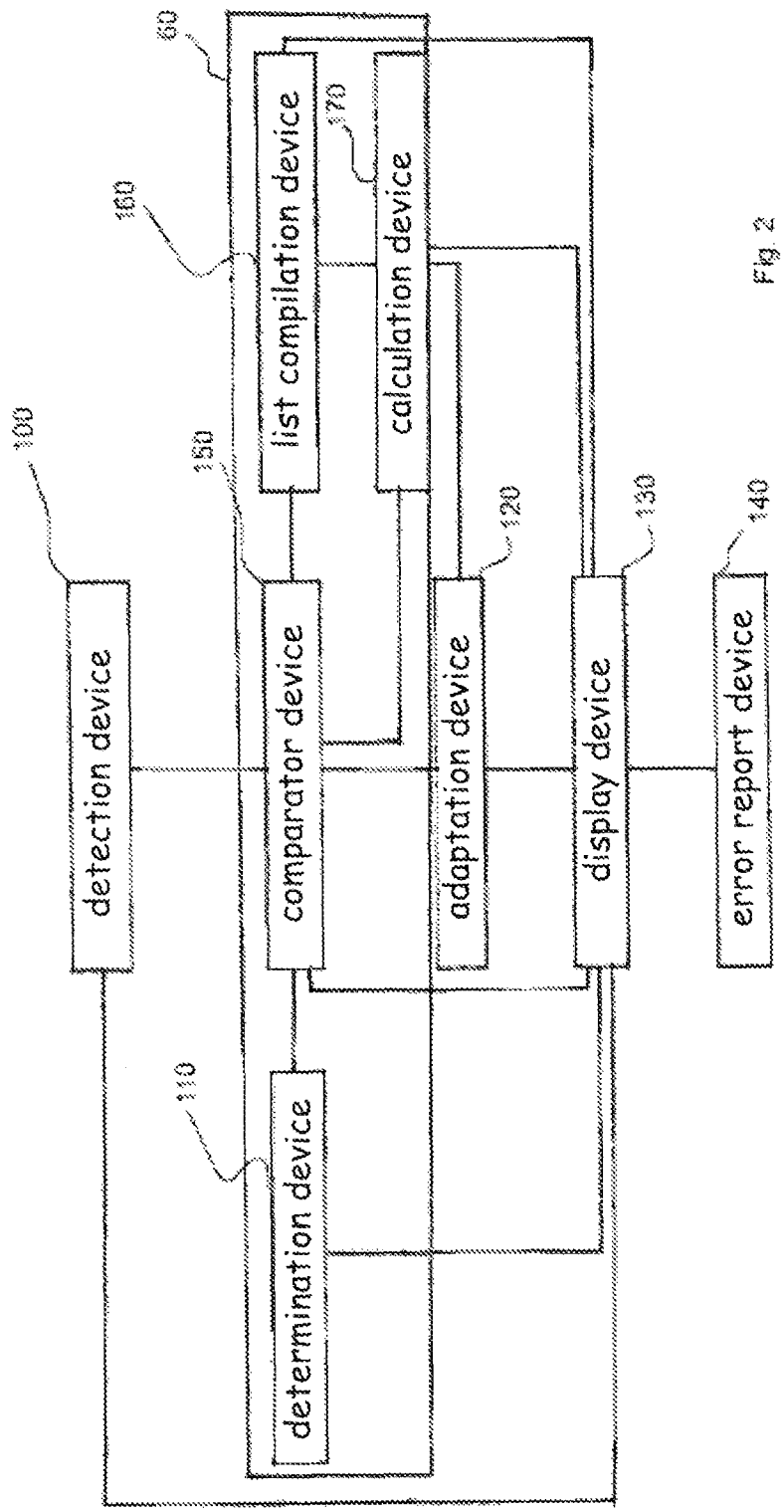
Figure 3:
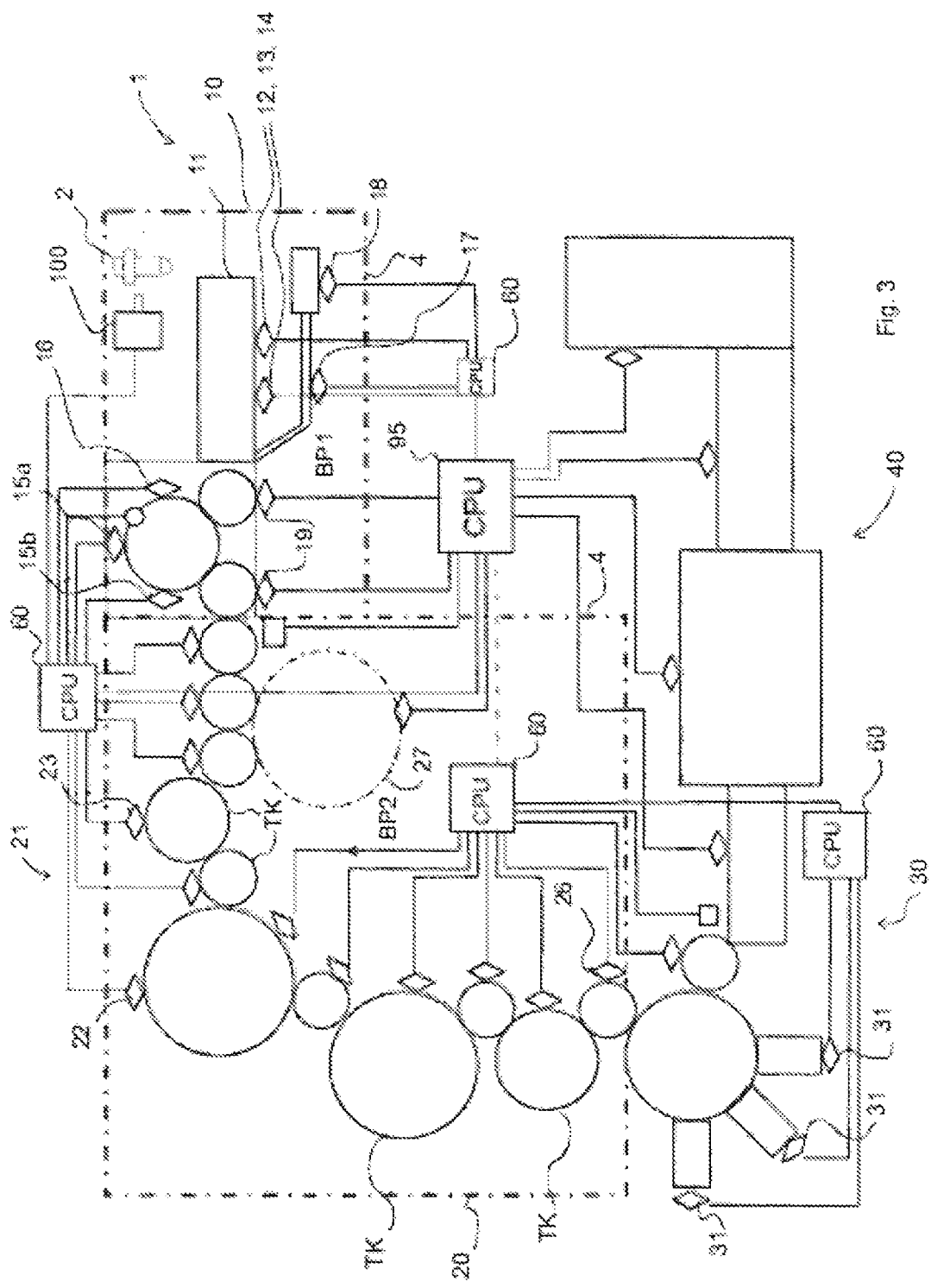

Further advantages and embodiments are evident from the accompanying drawings. In the drawings FIG. 1 is a diagrammatic illustration of a container treatment plant according to the prior art;

FIG. 2 is a flow chart according to the prior art;

FIG. 3 is a diagrammatic illustration of a container treatment plant in a further embodiment according to the prior art;

FIG. 4 is an illustration to clarify the transfer of data, and

FIG. 5 is an illustration to clarify the transfer of data.

DETAILED DESCRIPTION

FIG. 1 is a diagrammatic illustration of a container treatment plant 1 for the treatment of containers capable of being filled with a product. Pre-forms 2 of plastics material or glass containers 3 are supplied to the container treatment plant. The container treatment plant comprises a stretch blow moulding module 10, a filling module or an automatic filling module changing means 20 respectively, a labelling module 30 and a packing module 40. The stretch blow moulding module 10 and the filling module 20 are provided in each case with a protection device 4 in order to screen off the stretch blow moulding module 10 and the filling module 20 from extraneous influences or to protect operators from parts of the plant modules which could possibly injure the operator during the operation of the plant.

In the stretch blow moulding module 10, pre-forms 2 of plastics material, such as for example polyethylene terephthalate (PET) or polypropylene (PP), are heated in a heating device 11, which comprises a heating mandrel or an automatic heating mandrel changing means 12 respectively, a screening plate or an automatic screening plate changing means 13 respectively, and reflectors or an automatic reflector changing means 14 respectively, and they are shaped by means of a stretch blow moulding method into a container, such as for example a bottle, for a product, such as for example a liquid. To this end the stretch blow moulding module 10 additionally comprises a stretch rod/blow moulding nozzle or an automatic stretch rod/blow moulding nozzle changing means 15a respectively, a stretching cam/base cam or an automatic stretching cam/base cam adjusting or changing means 15b respectively, a blow moulding device or an automatic blow moulding device changing means 16 respectively, a rail setting device 17, a roller distance setting device 18 and clamps or an automatic clamp changing means 19 respectively for gripping the containers.

In the case of the supply of glass bottles 3 to the container treatment plant 1 it is possible for the stretch blow moulding module 10 to be by-passed. It should be pointed out that in the sense of this description the containers capable of being filled with a product should be understood to be, in particular, the pre-forms 2, the containers or plastic bottles respectively produced from them, and the glass bottles 3.

The individual treatment parameters relevant to the stretch blow moulding module are in this case the first treatment parameters and are designated with the reference BP1, such as for example a movement speed of a stretch bar, the geometrical form of a base shape, a blow moulding pressure to be applied to the plastics material pre-forms, a sequence of different blow moulding pressures for the expansion of the plastics material pre-forms, a temperature of the blow moulds and the like.

The containers produced by the stretch blow moulding module 10 for the product are supplied by way of conveying devices, such as for example conveying turntables TK, to the filling module 20 which fills the containers with at least one product and then closes them. To this end, the filling module 20 comprises a cleaning device 21 with a sterilization station 22 and a rinser 23 for cleaning the containers, a product mixing device 24 for mixing a product to be filled into the containers, a closure cap station 25 for supplying and applying closure caps to the containers, and a deflection star wheel or clamps 26 for the further conveying of the containers. If necessary, the containers arriving from the stretch blow moulding module 10 can be stored temporarily or buffered in a dynamic buffer 27.

The parameters used by the filling module 20 are in this case the second treatment parameters BP2, such as for example a filling speed, a filling temperature of the liquid to be filled, and the like.

After that, the filled and closed containers are supplied to the labelling module 30, are labelled by the latter by means of at least one labelling device 31 and are then supplied by way of conveying devices, such as for example conveying turntables TK, to the packing module 40 in which the containers are packed.

The treatment parameters used by the labelling module are in this case the third treatment parameters BP3, for example a glue used for the labels, a type of the labels and the like.

In addition, the container treatment plant 1 comprises testing devices 50 for testing the containers 2 treated by means of the container treatment plant 1. In this case, in FIG. 1 a testing device 50 is provided between the stretch blow moulding module 10 and the filling module 20 and a further testing device 50 is provided between the labelling module 30 and the packing module 40. If necessary, however, the testing devices 50 can also be provided on other or further locations in the container treatment plant 1. Defective containers can be separated out with the aid of a test result of the testing devices 50 before a further treatment by other plant modules.

Each of the plant modules 10, 20, 30 and 40 additionally comprises a plant module control device 60 which can be for example a programmable logic controller (PLC), as indicated in FIG. 1. The plant module control devices 60 are connected in series in FIG. 1. The communication of the plant module control devices 60 between one another can be carried out by way of a wireless local area network (wireless LAN) or by way of Bluetooth.

In order to detect properties of the containers or the product parameters respectively, the container treatment plant 1 additionally comprises a detection device 90 which can be for example a camera. The detection device 90 can also however be any desired sensor which is suitable for detecting identification markings of the containers. A sensor of this type can operate for example on the basis of an optical, magnetic or mechanical etc. principle. The detection device 90 is connected to the plant module control device 60 of the stretch blow moulding module 10. In addition, the detection device 90 can also communicate with a central control device 95, in which case the central control device can in turn pass relevant data on to the individual plant module control devices.

FIG. 2 illustrates a method according to the internal prior art of the Applicants, in which case, however, the individual aspects are capable of being combined with the features of the present invention.

As shown in FIG. 2, each plant module control device 60 has a determination device 110, a comparator device 150, a list compilation device 160 and a calculation device 170. In this case the determination device 110 is used to determine the treatment elements mounted in the container treatment plant 1 or treatment results to be achieved by means of treatment elements or recipes respectively for the treatment of the containers which are described in greater detail below. To this end the treatment elements can be provided with RFID chips (RFID: radio frequency identification) and/or a code, such as for example a bar code or another two-dimensional code, which is capable of being read out by radio or in accordance with an optical, magnetic or mechanical principle and so forth. The function of the comparator device 150, the list compilation device 160 and the calculation device 170 will be described in greater detail below.

In addition, the container treatment plant 1 has an adaptation device 120 shown in FIG. 2 for adapting the treatment elements mounted in the container treatment plant 1 or treatment results to be achieved by means of treatment elements or recipes respectively for the treatment of the containers which are described in greater detail below. This means that in the sense of this description the expression "treatment element" covers both a tool, such as for example the clamps 19, and treatment results to be achieved by means of treatment elements as well as recipes for the treatment of the containers.

The container treatment plant 1 has, in addition, a display device 130 shown in FIG. 2 for the display of information on for example operating states of the container treatment plant 1 or the individual plant modules 10, 20, 30, 40 thereof or the treatment elements thereof and so forth. The display device 130 can be any desired conventional display device.

In the event of an error during the operation of the container treatment plant 1, an error report device 140 can issue an error report, such as for example an optical or acoustic alarm. The alarm can also be displayed by means of the display device 130.

As previously described, each of the plant modules 10, 20, 30 and 40 therefore carries out a special or pre-determined treatment of the containers, such as stretch blow moulding, filling, labelling etc.

To this end, each of the plant modules 10, 20, 30 and 40 of the container treatment plant 1 comprises a plurality of different fittings or treatment elements respectively, which are capable of being used in the case of the different treatments of the containers. This means that the stretch blow moulding module 10 comprises for example the following treatment elements: heating mandrels 12, screening plate 13, reflectors 14, stretch bar/blow moulding nozzle 15, rail setting device 17, roller interval setting device 18, clamps 19 etc.

Bottles are also mentioned below when the containers produced from the pre-forms 2a or the glass containers 3 are meant.

Expressed in a more precise manner, the individual named plant modules 10, 20, 30 and 40 of the container treatment plant and plant modules not shown (pasteurization module for the pasteurization of products capable of being filled into containers, container cleaning module for cleaning containers and preferably reusable bottles, crate washing module for washing crates) of the container treatment plant comprise for example the following individual treatment elements or treatment results to be achieved by means of treatment elements or recipes respectively, in which case the individual treatment elements are not all illustrated in FIG. 1 for the sake of simplicity. In this case parameters capable of being changed are also illustrated in each case.

The plant modules 10, 20, 30 and 40 named and the numerous treatment elements thereof named above are in each case known from the prior art and are consequently not described in greater detail here. It is preferable for the respective adaptation of the treatment elements to be carried out fully automatically.

The operation of the container treatment plant 1 associated with the adaptation device 120 will be described in greater detail below.

In a filling line of the container treatment plant 1 the detection device 90 detects identification markings of one of the containers 2, 3 to be treated, as described above. The detection results of the detection device 90 are supplied to the comparator device 150. The comparator device 150 then carries out a comparison of a detection result or of the detection results of the detection device 90 with a nominal value of the container for the plurality of treatment elements 11 to 19, 21 to 27, 31.

The nominal value of the container indicates which type of container 2, 3 the treatment element 11 to 19, 21 to 27, 31 can treat. This means that the nominal value of the container indicates for example whether the container 2, 3 is a pre-form 2 for a plastic bottle holding 0.5 litres for example, a pre-form 2 for a plastic bottle holding 1.0 litre for example, a pre-form 2 for a plastic bottle holding 1.5 litres for example etc., or a pre-form 2 of PET or PP, or a glass bottle 3 and so forth.

Further values which can be allocated to the nominal value of a container 2, 3 are: a height and/or a diameter of a mouthpiece of a pre-form 2 or container 2, 3; a diameter of a conveying ring (bulge in the shoulder region of plastic bottles, in particular PET bottles); an overall height or a maximum diameter of a container, such as for example a bottle; a diameter in a specified height for the engagement of treatment units, in particular the diameters directly above and below the conveying ring, the ground clearance of a shaped container, for example a bottle (distance between supports of the bottle from the injection point); a material or a material composition of the container 2, 3; a crystallinity of the material of the container 2, 3; a type of the thread and/or a closure (for example cork, snap closure, crown cap) of the container 2, 3; a diameter and a height of the closure; a colour of the container material; a wall thickness of the container 2, 3 in specific areas; strengths, such as for example top load, of the container 2, 3.

The nominal value of the container can be stored beforehand in a storage device (not shown). This storage device can be, in particular, the RFID chip or code mentioned above which is attached to the treatment elements. It is preferable for there to be a bar code.

If a comparison carried out by the comparator device 150 indicates that the detection result of the detection device 100 is not equal to the nominal value of the container for the at least one treatment element 11 to 19, 21 to 27, 31, the adaptation device 120 can adapt at least one treatment element 11 to 19, 21 to 27, 31 of the plurality of treatment elements 11 to 19, 21 to 27, 31. This means that the adaptation device 120 can either exchange or adjust the at least one treatment element 11 to 19, 21 to 27, 31 of the plurality of treatment elements 11 to 19, 21 to 27, 31.

In addition, the list compilation device 160 can compile a list in which the treatment elements 11 to 19, 21 to 27, 31 are listed, for which the comparison carried out by the comparator device 150 indicates that the detection result of the detection device is not equal to the nominal value of the container for the at least one treatment element 11 to 19, 21 to 27, 31. The list can be displayed on the display device 130. In this case the list can provide indications as to which treatment elements are still to be exchanged or adjusted, and/or can indicate which treatment elements are just being exchanged or adjusted. In this way, an operator can choose whether the treatment elements still to be exchanged or adjusted are to be exchanged or adjusted automatically, i.e. to be adapted, or whether the operator might optionally adapt specified treatment elements himself or herself.

It is preferable for the calculation device 170 to carry out a calculation of a sequence which is a sequence of an adaptation of at least one treatment element 11 to 19, 21 to 27, 31 of the plurality of treatment elements 11 to 19, 21 to 27, 31. In a particularly advantageous manner this sequence is a sequence in which an opening of the protection device 4 of the container treatment plant 1 is not obstructed by the adaptation of at least one treatment element 11 to 19, 21 to 27, 31 of the plurality of treatment elements 11 to 19, 21 to 27, 31. In addition, this sequence can be displayed on the display device 130.

If a comparison carried out by the comparator device 150 indicates that the detection result of the detection device is not equal to the nominal value of the container for the at least one treatment element 11 to 19, 21 to 27, 31, the plant module control devices 60 prevent an operation of the container treatment plant 1. This means that, if the container treatment plant 1 is still in operation when the comparison carried out by the comparator device 150 indicates the named result, the container treatment plant 1 is stopped by a device (not shown) for stopping the container treatment plant 1. If, however, the container treatment plant 1 is not in operation or is at a standstill when the comparison carried out by the comparator device 150 indicates the named result, a start of the container treatment plant 1 is made impossible or is prevented. To this end the container treatment plant 1 can comprise a device (not shown) for preventing the container treatment plant 1 from starting. The forcible stopping of the container treatment plant 1 or the forcible preventing of a start of the container treatment plant 1 can likewise be displayed on the display device 130.

In the named cases in which an adaptation of at least one treatment element 11 to 19, 21 to 27, 31 is necessary, an error report which can also be displayed on the display device 130 can additionally be issued by means of an error report device 140.

Since the individual plant module control devices 60 are connected in series in accordance with this embodiment, it is possible for example for the plant module control device 60 of the filling module 20 to build on the results which have already been achieved by the plant module control device 60 of the stretch blow moulding module 10. This means that the comparator device 150, the list compilation device 160 and the calculation device 170 of the plant module control device 60 of the filling module 20 can make use not only of the nominal values of the container, as is the case for the comparator device 150, the list compilation device 160 and the calculation device 170 of the plant module control device 60 of the stretch blow moulding module 10, but also the ones of the the comparator device 150, the list compilation device 160 and the calculation device 170 of the plant module control device 60 of the stretch blow moulding module 10.

(Second Embodiment)

Apart from the carrying out of the control of the plant modules 10, 20, 30 and 40, the second embodiment is identical to the first embodiment. Only the parts of the second embodiment which are different from the first embodiment are therefore described below. The same parts and parts with the same value are provided with the same reference numbers.

As is evident from FIG. 3, the individual plant control devices 60 are not connected in series, as in the case of the first embodiment, but they are connected by way of a bus system to a central plant control device 70. This central plant control device 70 is superordinated to the individual plant control devices 60 and can give the individual plant control devices 60 control commands which can change over the individual plant control devices 60 for the plant modules 10, 20, 30 and 40. As additionally indicated in FIG. 3, both the individual plant control devices 60 and the central plant control device 70 have a CPU (central processing unit).

In accordance with the second embodiment the central plant control device 70 has the comparator device 150, the list compilation device 160 and the calculation device 170. The central plant control device 70 then gives commands on the basis of the results reached by the comparator device 150, the list compilation device 160 and the calculation device 170 to each of the plant control devices 60.

As shown in FIG. 3, the individual treatment elements are allocated to plant control devices 60 other than shown in FIG. 1. Depending upon requirements, this allocation can also be selected in a different manner.

In the case of this embodiment, all the other elements and functions are the same as those of the first embodiment and are therefore not described once again.

(General)

All the arrangements of the container treatment plant 1 and the container treatment method described above can be used individually or in all possible combinations. In this case the following modifications in particular are possible.

The control of the container treatment plant 1 can also be carried out by way of a separate computer. In this case an interface can be present on the detection device 100 which in particular can be a camera. The detection device 100 can communicate by way of the interface with a separate computer, for example by wire, by radio and so forth.

The evaluation of the results detected by the detection device 100, which can be signals, can also be carried out directly in the detection device 100 which is a sensor for example.

By way of example, the adaptation device 120 can be a robot which shuts down all the treatment elements of the container treatment plant 1 and carries out necessary adaptations of the treatment elements.

It is additionally possible for the exchange of the treatment elements to be carried out without tools by means of the adaptation device 120. This is possible for example in particular for the pivot arm and/or the heating mandrels 12 and/or the screening plate 13.

In addition, the adaptation of the treatment elements of the filling module 20, the labelling module 30 and the packing module 40 as well as the testing devices 50 can be carried out automatically if a suitable choice of recipe has been carried out on the stretch blow moulding module, for example by an operator. An entry by the operator could be carried out in practice with the choice of recipe, or by entry of the choice of recipe respectively, in particular by way of a switching device (not shown), such as for example a button.

It is additionally possible for the adaptation device 120 to adapt only some of the treatment elements which have been designated as a whole as having to be adapted. In this case it is possible for at least two treatment elements to be changed automatically by the adaptation device 120, whilst the other treatment elements which are designated as still to be adapted are adapted by an operator. Instead of the at least two treatment elements, it is also possible for at least three or more treatment elements to be changed automatically by the adaptation device 120.

FIG. 4 is an illustration to clarify a method according to the invention for data transfer. In this case the reference number 90 relates to a detection device, such as for example a bar code reader, which is used to read out an identification marking 80 which is present on the container 2. In this case this identification marking 80 can be situated on a separate label 84 on the container, but it would also be possible for the identification marking to be situated on the standard label 82 which is present on the container 2.

The container 2 can in this case be both a standard container and a special reference bottle. In this way, product parameters PP can be read out of the identification marking 80 by means of the detection device 90. In principle it would also be possible for the respective product parameters to be printed directly on the identification marking, but it is preferable for the identification marking to have applied to it symbols, for example a bar code, which are characteristic of at least one product parameter and preferably characteristic of a plurality of product parameters.

These product parameters can in this case be details on for example the material of the plastics material pre-form, the manufacturer of the plastics material pre-form, a pre-form charge, a closure material, a manufacturer of the container closures, a closure charge, a label material, a label manufacturer, a label charge or for example also a cardboard box or sheet material.

In addition, however, further product parameters would also be possible, such as for example a volume of the finished container, details on the blow moulds to be used and the like. These product parameters are supplied to the individual machines or plants respectively of the container treatment plant as relevant data on the material actually used in order to control the machine or an individual machine control means 60. In this case it is possible for the detection device 90 to pass the product parameters PP on to the central control means 95 mentioned above. Just the central control means 95 can determine from the product parameters PP the individual treatment parameters BP1, BP2 and BP3 and then pass these on to the individual plants 10, 20, 30 or the control means thereof in each case.

A further procedure is illustrated in FIG. 5. In this case the product parameters PP are passed on to the individual control means 60 and the latter then determine from them the individual treatment parameters BP1, BP2 and BP3. The individual changes or settings of the machine elements can be carried out on the basis of the individual treatment parameters, or on the other hand the user can be instructed accordingly as to how the changes are to be carried out. Examples of the changes have already been given above. In addition, it would also be possible for the product parameters to be passed on to only one of the control means 60 or to be already present at this one control means and then to be passed on from this control means 60 to the control means 60 of the other treatment units and for these further treatment units then to determine the respective treatment parameters (for example BP2 and BP3) from the respective product parameters.

In this way, in the case of the method illustrated in FIGS. 4 and 5 it is not necessary for the containers to be measured, but in a simpler manner the parameters characteristic of the container are read out from the identification marking and are then used for the machine change.

The Applicants reserve the right to claim all the features disclosed in the application documents as being essential to the invention, insofar as they are novel either individually or in combination as compared with the prior art.

LIST OF REFERENCES 1 container treatment plant
2 pre-forms
3 glass container
4 protection device
10 stretch blow moulding module
11 heating device
12 heating mandrel or automatic heating mandrel changing means respectively
13 screening plate or automatic screening plate changing means respectively
14 reflectors or automatic reflector changing means respectively 15a stretch bar/blow moulding nozzle or automatic stretch bar/blow moulding nozzle changing means respectively
15b stretching cam/base cam or automatic stretching cam/base cam adjustment or changing means respectively
16 blow mould device or automatic blow mould changing means respectively
17 rail setting device
18 roller distance setting device
19 clamps or automatic clamp changing means respectively
20 filling module or automatic filling module changing means respectively
21 cleaning device
22 sterilization station
23 rinser
24 product mixing device
25 closure cap station
26 deflection star wheel or clamps
27 dynamic buffer (Acculink)
30 labelling module
31 labelling device
40 packing module
50 testing device
60 plant module control device
90 detection device
95 central plant module control device
110 determination device
120 adaptation device
130 display device
140 error report device
150 comparator device
160 list compilation device
170 calculation device
TK conveying turntable
BP1 first treatment parameters
BP2 second treatment parameters
BP3 third treatment parameters
PP product parameters

The invention claimed is:

1. A method of operating a plant for the treatment of containers, comprising: the containers are treated by a first treatment unit of the plant with pre-set first treatment parameters and the containers are treated by a second treatment unit of the plant with pre-set second treatment parameters, and wherein the first treatment parameters and the second treatment parameters are variable at least in part and depend at least in part upon product parameters associated with the container, wherein the product parameters of the container are deposited in the control device of the first treatment unit for the control of the first treatment unit and are transferred to the control device of the second treatment unit and also used for the control of the second treatment unit, wherein changes in the product parameters are taken into consideration in an automated manner both for the control of the first treatment unit and for the control of the second treatment unit.

2. The method according to claim 1, wherein at least one of the first treatment unit and the second treatment unit is a shaping device for shaping plastics material pre-forms into plastics material containers.

3. The method according to claim 1, wherein at least one product parameter of the container is determined by the detection of an identification marking allocated to the container and at least one treatment parameter is changed basis on the parameter.

4. The method according to claim 1, wherein at least one of the first treatment unit and the second treatment unit of the plant has a plurality of treatment elements and the treatment parameters of a plurality of treatment elements are changed.

5. The method according to claim 1, wherein information on the container to be produced is displayed by way of a display device in a manner dependent upon the parameters detected.

6. A plant for the treatment of containers, comprising:
a first treatment unit which treats the containers in a first pre-set manner and with a first control device which controls the treatment of the containers by the first treatment unit on the basis of pre-set first treatment parameters, wherein these first treatment parameters are capable of being changed at least in part and depend at least in part upon product parameters associated with the containers to be treated, and
a second treatment unit which threats the containers in a second pre-set manner and with a second control device which controls the treatment of the containers by the second treatment parameters are capable to being changed at least in part and depend at least in part upon the product parameters of the containers to be treated, wherein the product parameters of the container deposited in the first control device for the control of the first treatment unit are transferred to the second control device and also used for the control of the second treatment unit, wherein changes in the product parameters are taken into consideration in an automated manner both for the control of the first treatment unit and for the control of the second treatment unit.

7. The plant according to claim 6, wherein the plant has a data transfer device which transfers the product parameters relevant to the control of the first treatment unit to the second control device of the second treatment unit.

8. The plant according to claim 6, wherein the plant has a detection device for detecting an identification marking which is allocated to the container, wherein the detection device communicates in terms of data with at least the first control device at least for a time to transmit product parameters of the container determined by detection of the identification marking to the control device.

9. A plant according to claim 6, wherein the plant has a central control unit which communicates in terms of data with the first and second control devices of the first and second treatment units at least for a time.

* * * * *